United States Patent
Buerkle et al.

(10) Patent No.: US 11,620,134 B2
(45) Date of Patent: Apr. 4, 2023

(54) CONSTRAINED CARRIES ON SPECULATIVE COUNTERS

(71) Applicant: INTERNATIONAL BUSINESS MACHINES CORPORATION, Armonk, NY (US)

(72) Inventors: Dan Buerkle, Cincinnatus, NY (US); James W. Bishop, Newark Valley, NY (US); Maria Lorena Pesantez, Travis, TX (US); David Henry Wilde, Rowland Heights, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/364,824

(22) Filed: Jun. 30, 2021

(65) Prior Publication Data

US 2023/0004396 A1    Jan. 5, 2023

(51) Int. Cl.
*G06F 9/38* (2018.01)
*G06F 11/34* (2006.01)

(52) U.S. Cl.
CPC ........ *G06F 9/3842* (2013.01); *G06F 11/3466* (2013.01)

(58) Field of Classification Search
CPC .............. G06F 9/3842; G06F 9/30094; G06F 11/3466; G06F 2201/88; H03K 21/40
See application file for complete search history.

(56) References Cited

U.S. PATENT DOCUMENTS

| | | | |
|---|---|---|---|
| 6,675,372 B1 | 1/2004 | Damron | |
| 6,920,547 B2 | 7/2005 | Roth et al. | |
| 7,426,253 B2 * | 9/2008 | Gara | H03K 23/54 377/37 |
| 7,606,979 B1 | 10/2009 | Rozas et al. | |
| 7,716,457 B2 | 5/2010 | Caprioli et al. | |
| 7,818,551 B2 | 10/2010 | Joao et al. | |
| 8,345,816 B1 * | 1/2013 | Adiga | G06F 11/348 377/49 |
| 9,019,737 B2 | 4/2015 | Argyres | |
| 9,070,435 B2 | 6/2015 | Iyengar | |
| 9,542,191 B2 | 1/2017 | Caprioli et al. | |
| 10,635,445 B2 | 4/2020 | Teyssier et al. | |

(Continued)

OTHER PUBLICATIONS

Liu, S. et al., "Value Prediction and Speculative Execution on GPU"; International Journal of Parallel Programming (2011); vol. 39:5, pp. 533-552.

(Continued)

*Primary Examiner* — Courtney P Carmichael-Moody
(74) *Attorney, Agent, or Firm* — Intelletek Law Group, PLLC; Gabriel Daniel, Esq.

(57) ABSTRACT

A computer-implemented method for of constrained carries on speculative counters includes providing one or more speculative counters having an upper portion of most significant bits partially embedded in a random-access memory (RAM) array, and a pre-counter portion external to the RAM array having a plurality of least significant bits. The one or more speculative counters are configured to count a plurality of events of interest during a processor core instruction execution. A carry output from the pre-counter portion to the RAM array is suppressed for a duration of a speculative event period.

19 Claims, 4 Drawing Sheets

(56) References Cited

U.S. PATENT DOCUMENTS

2008/0222400 A1* 9/2008 Becker ............... G06F 11/3466
712/225
2017/0235638 A1 8/2017 Knauth et al.

OTHER PUBLICATIONS

Zagha, M. et al., "Performance Analysis Using the MIPS R10000 Performance Counters"; Proceedings of the 1996 ACM/IEEE Conference on Supercomputing (1996); 20 pgs.

* cited by examiner

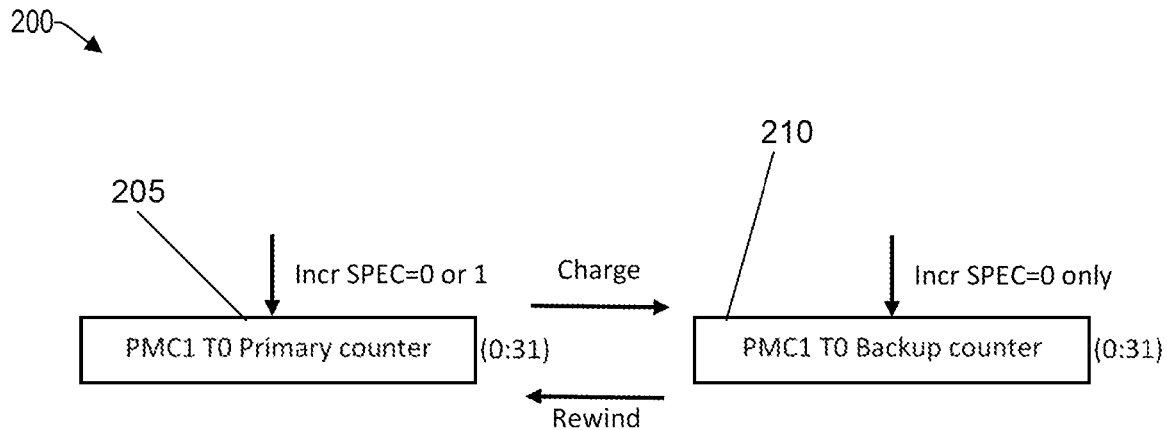

- When counting PMC1 events when SPEC=0, both Primary and Backup counters increment equally with the input event count.
- When counting PMC1 events when SPEC=1, only the Primary counter increments by these speculative event count inputs, while the Backup counter holds at a "rewind" value.
- If a Charge determination occurs, then the Backup counter is updated with the current speculative count in the Primary counter.
- If a Rewind determination occurs, then the Primary counter is reloaded with the Backup counter value to return to the pre-speculative count value.

FIG. 2

CONSTRAINED CARRIES ON SPECULATIVE COUNTERS

BACKGROUND

Technical Field

The present disclosure generally relates to systems and methods for speculative event counting by a computer processor, and more particularly, to a computer method and system for constrained carries on speculative counters.

Description of the Related Art in a computer's Central Processing Unit (CPU), there are one or more processor cores that have various types of counters. For example, a POWER10® processor core includes Performance Monitor Counters (PMCs) configured to count events of interest that occur during the execution of instruction streams. PMC's can be configured to count many types of processor core events, some of which are speculative in nature. Such speculative PMCs are used for a set of events where there is uncertainty as to which event(s) in the set will actually occur during an instruction execution period. The carry bits from such speculative PMCs can increase the complexity of ensuring the values in the ail the counters are accurate.

SUMMARY

According to one embodiment, a computer-implemented method of constrained carries on speculative counters includes providing one or more speculative counters having an upper portion of most significant bits partially embedded in a random-access memory (RAM) array, and a pre-counter portion external to the RAM array having a plurality of least significant bits. The one or more speculative counters are configured to count a plurality of events of interest during a processor core instruction execution. A carry output from the pre-counter portion to the RAM array is suppressed for a duration of a speculative event period.

In an embodiment, the method includes implementing the pre-counter portion of the one or more speculative counters with latches, and storing the suppressed carry output in a speculative carry latch.

In an embodiment, the method includes configuring the pre-counter portion of each speculative counter to include a primary pre-counter configured to count the plurality of events of interest during the speculative event period, storing a backup copy of the primary pre-counter in a secondary pre-counter, and storing a rewind value in the secondary pre-counter.

In an embodiment, the method includes wrapping the primary pre-counter to 0 after the carry output is stored in a speculative carry latch.

In an embodiment, the method includes upon determining that the speculative event has occurred with a charge disposition and that both the carry output and a wrapping to 0 has occurred in the primary pre-counter associated with the speculative event, the suppressed carry is sent to the RAM array.

In an embodiment, the method includes incrementing the primary pre-counter based on a count of speculative events until a maximum primary pre-counter value is reached that is 1 less than the secondary pre-counter value, and pausing the updating primary pre-counter for a duration of the speculative event.

In an embodiment, the method includes upon determining that the speculative event has occurred with a charge disposition, updating the secondary pre-counter to the value of the primary pre-counter.

In an embodiment, the method includes performing a rewind disposition upon determining the speculative event did not occur during the speculative event period; wherein the rewind disposition includes clearing the speculative carry latch to an inactive state; and reloading the primary pre-counter with a value of the secondary pre-counter. In an embodiment, the method includes determining that the speculative event has occurred, and updating the secondary pre-counter associated with the speculative event with a value of the primary pre-counter.

In an embodiment, the method includes determining a rewind disposition is to occur by determining that the speculative event has not occurred and the primary pre-counter associated with the speculative event has not exceeded a bit-width limit and suppressed an output carry. The rewind disposition includes updating the primary pre-counter with a value of the secondary pre-counter.

According to an embodiment, a carry suppression system of a processor core includes one or more speculative counters configured to count a plurality of speculative events of interest during a processor core instruction execution. Each of the one or more speculative counters has an upper portion partially embedded in a random-access memory (RAM) array configured to store a most significant plurality of bits and a pre-counter portion externally connected to the RAM array, the pre-counter portion configured to store a plurality of least significant bits. A carry controller connected to the pre-counter portion is configured to control the sending of a carry bit from the pre-counter portion of the one or more speculative counters, and to suppress the sending of the carry bit from the pre-counter portion to the upper portion for a duration of a speculative event period.

In an embodiment, a speculative carry latch is connected to the carry controller and configured to store the suppressed carry bit output from the pre-counter portion.

In an embodiment, the pre-counter portion of each speculative counter includes a primary pre-counter configured to count events of interest during the speculative event period, and a secondary pre-counter configured to store a backup copy of the primary pre-counter and to store a rewind value.

In an embodiment, a RAM array control logic is connected to the RAM array and the carry controller. The RAM array control logic is configured to control reading from and writing to the RAM array including updating the RAM array with a carry bit received from the carry controller.

In an embodiment, the carry controller is configured to wrap the primary pre-counter to 0 after the carry output is stored in a speculative carry latch.

In an embodiment, the carry controller is configured to determine that the speculative event has actually occurred with a charge disposition, and to send the suppressed carry stored in the speculative carry latch to the RAM array control logic for updating the RAM array when both the carry output and a wrapping to 0 has occurred in the primary pre-counter associated with the speculative event.

In an embodiment, the carry controller is configured to increment the primary pre-counter based on a count of speculative events until a maximum primary pre-counter value is reached that is 1 less than the secondary pre-counter value, and pause the updating of the primary pre-counter for a duration of the speculative event.

In an embodiment, the carry controller is configured to update the secondary pre-counter to the paused value of the primary pre-counter, when the speculative event has actually occurred resulting in a charge disposition.

In an embodiment, the carry controller is further configured to perform a rewind when the speculative event has not occurred during the speculative event period, clear the speculative carry latch to an inactive state, and reload the primary pre-counter with a value of the secondary pre-counter.

According to an embodiment, a non-transitory computer readable storage medium tangibly embodies a computer readable program code having computer readable instructions that, when executed, causes a computer device to perform a method of constrained carries on speculative counters. The method includes configuring one or more speculative counters having an upper portion of most significant bits partially embedded in a random-access memory (RAM) array and a pre-counter portion external to the RAM array having a plurality of least significant bits. The one or more speculative counters are configured to count a plurality of events of interest during a processor core instruction execution. A carry output from the pre-counter portion is suppressed from being sent to the RAM array for a duration of a speculative event period. The suppressed carry output is stored in a speculative carry latch for a duration of a speculative period. The RAM array is updated with the suppressed carry stored in the speculative carry latch in response to determining the speculative event occurred.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition to or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

FIG. 2 illustrates an example of the interaction between a primary and secondary pre-counter portions of a speculative carrier, consistent with an illustrative embodiment.

DETAILED DESCRIPTION

Overview

Figure 1:
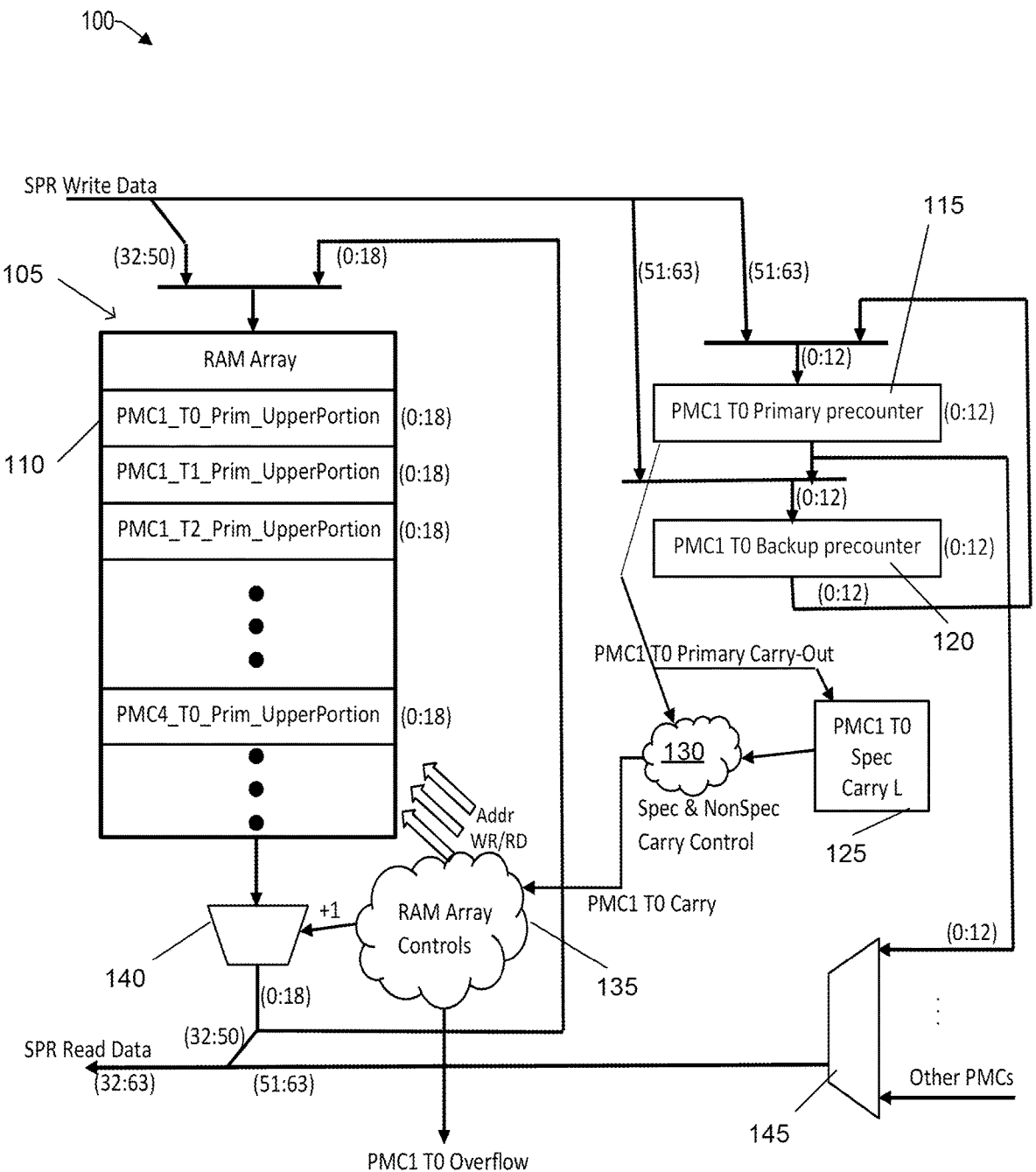
FIG. 1 illustrates a constrained carry scheme for a processor core, consistent with an illustrative embodiment.

In the following detailed description, numerous specific details are set forth by way of examples to provide a thorough understanding of the relevant teachings. However, it should be understood that the present teachings may be practiced without such details. In other instances, well-known methods, procedures, components, and/or circuitry have been described at a relatively high level, without detail, to avoid unnecessarily obscuring aspects of the present teachings.

As used herein, the term "speculative execution" generally refers to an execution of code that is performed speculatively prior to determining whether the execution of such code should occur or is needed. For example, branch prediction utilizes speculative execution for a predicted branch.

As used herein, the term "speculative counting" generally refers to processor core events that occur in the CPU during a speculative execution. For example, a number of cycles and instructions executed by a speculative execution of a portion of a program such as a conditional branch. Processor performance monitor counters (PMC) generally refer to counters that are configured to count the events that occur at the CPU, and may include cache misses, and/or off-chip memory access. Speculative PMCs count the speculative events in which there is uncertainty as to whether one, some or all of the event(s) in a set will actually occur during the instruction execution period.

As used herein, the terms "charged" and "rewind" generally refer to whether the speculative event occurs. When a speculative event occurs, the count an associated PMC is "charged." When a speculative event does not occur, a "rewind" operation returns the associated PMC to its earlier value.

In a modern processor core, also known as a computer's CPU (Central Processing Unit), there exist various types of counters that generally include Performance Monitor Counters (PMCs). PMCs are configured to count events of interest which occur during instruction stream execution. More particularly, PMCs are configured to count a variety of processor core events, some of which are speculative in nature.

Speculative PMCs are used for counting a set of uncertain (speculative) events that may occur during an instruction execution period. Speculative PMCs and one or more associated speculative events can be used to measure a processor's performance for stall and latency delays due to data or resource dependencies venue (e.g., when data is unavailable or a resource is busy). Such speculative events can be attributed to a number of different causes within a major dependency category, such as a lack of data from cache, memory, storage, a long vector or fixed-point instruction, or an instruction execution pipeline flush.

In a case where an exact cause of a speculative event is not clear at the beginning of the pause/stall/delay and will not be resolved until the end of the speculative event period, multiple speculative PMCs can be used, where at least one speculative PMC is assigned for each distinct event cause. When the speculative event(s) ends and the actual cause is revealed, only the count(s) of the speculative PMC(s) assigned to count the revealed cause will have their count(s) saved. The speculative PMCs assigned to other causes that did not occur will be returned to their pre-speculative counting value(s). When a speculative event occurs and its associated speculative PMC value is saved, the count is referred to as being "charged" to the PMC. When a speculative event does not occur and the PMC value is returned to its earlier value, it is said to experience a "rewind" operation.

In certain architectures that include but are not limited to POWER10® architecture, PMCs are designated as Special Purpose Registers (SPRs) that adhere to certain access rules and behavior as specified in an Instruction Set Architecture documentation. For example, in the case of a 64-bit scalar machine, any SPR can be up to 64 bits wide. Each PMC can be configured to count one of a multitude of different events, and to count different kinds of events, either speculative (charged or rewound), or direct (always charged by default).

PMCs that are 32-bit Read/Write SPRs accessible by the processor (via "move from special purpose register" (MFSPR) and "move to special purpose register" (MTSPR) instructions) can be pre-programmed by software, and are controlled by a multitude of other performance monitor control SPRs. These performance monitor control SPRs are used to configure modes of monitoring, identify start and stop conditions, provide selection from a wide palette of possible events and assign a particular event to a given PMC, among other control duties. Once configured and started, these PMCs count selected events under internal processor hardware control. Wrapping of the PMCs is permitted from a maximum value to 0 with continued counting, as are stop and pause/freeze conditions, as well as multiple counter chaining. The PMCs can be programmed to interrupt the processor when certain counting conditions are met.

To enhance the semiconductor chip area and power efficiency, many SPRs including the PMCs are implemented on a processor chip using embedded RAM arrays. Even with multi-port arrays, access delays of multiple machine cycles are incurred, while the PMCs must have the capability to increment every cycle, and thus some number of least significant bits (LSB's) must be implemented using latches (D-FF), for instantaneous updating and visibility. These LSB's of a PMC are referred to as the "pre-counter" portion. PMC Pre-counters carry-out conditions then form the carry-in (increment control signal) of the upper-bit portions of that PMC, which is saved in the RAM Register Array.

Controlling the accesses to the RAM array PMC upper-bit portion contents for carry and SPR access presents complexity challenges of scheduling and priority management, as well as pipelining of array command/address presentation, read data capture, and write data provision. An arbitration scheme is typically used along with logic to make all the values correct. RAM array pipelining of command, address, and controls are used for high performance, affording unique PMC upper-bit portion access every machine cycle. This complexity is compounded if multiple carry occurrences to the same PMC upper-bit portion are allowed prior to a first carry to that PMC location is performed and saved into the RAM array, and is compounded even further if speculative counting carries are inflicted on the PMC locations (since these speculative carries may be cancelled if a future Rewind occurs).

According to an embodiment of the present disclosure, the compounded complexity of multiple carry occurrences to the same PMC RAM array location are greatly reduced or eliminated. More particularly, the approach to controlling speculative PMC pre-counter carries includes providing these carries to pre-counters only for the duration of the speculative uncertainty period. Speculative PMC pre-counters are defined with two copies: a primary counter which counts during the period of speculation, and a backup copy which saves the rewind value. To prevent the carry from propagating to the RAM array portion the primary pre-counter copy is allowed to increment speculatively as usual, and if/when the primary pre-counter copy reaches the limiting largest value representable by its bit-width, its carry output is suppressed from being sent to the RAM array control logic while also being saved in a latch. At that point of being saved in the latch, the primary pre-counter copy wraps back to '0' and continues incrementing. In the event that the primary pre-counter copy increments to a particular value that is 1 less than the backup Rewind pre-counter saved value, then the primary pre-counter copy is held or paused at that particular value for the duration of the speculative event period. The hold/pause is an improvement in computer operation because the full maximum headroom/size/capability of the primary pre-counter can be used for any given speculative event.

If the event continues after the speculative event period, the primary pre-counter copy remains held and counts no further. When the speculative event has been found to occur with a charge disposition, and if the associated Speculative PMC primary pre-counter experienced a carry and wrap, then the suppressed carry is sent to the RAM array control logic and the backup pre-counter copy is updated to the currently held maxed-out primary pre-counter copy value. If a rewind disposition is found to occur, then the carry latch is cleared to its inactive state thereby discarding the suppressed carry, and the primary pre-counter is reloaded with the backup pre-counter copy's value.

If the Speculative PMC primary pre-counter copy does not reach its limit and carry point, then normal actions are taken, with no carry being saved aside and suppressed, and no holding or stoppage of incrementation by the primary pre-counter copy. For a charge speculative event disposition, the backup pre-counter copy is updated with the primary pre-counter copy value. For a rewind speculative event disposition, the primary pre-counter copy is returned to the backup copy value.

In an illustrative embodiment, there is a "sweet spot" having a most efficient capacity for the pre-counter width such that the Speculative counting Maximum Hold value is both large enough to be useful for longer speculative events, and small enough to provide adequate circuit and power savings. The ideal capacity enables the RAM to be utilized to as great an extent as possible.

In an embodiment, a 13-bit pre-counter size is used. 8,192 cycles or event activations capability, and a 32-bit overall PMC width. Max PMC primary pre-counter state can itself be selected as an event whose duration can be counted via a PMC.

The computer-implemented method and system of the present disclosure advantageously provides improved performance of processor core architecture. As speculative events may not occur, the arrangement of the least significant bits in a pre-counter arrangement external to the RAM array with a suppressed carry relieves the RAM array of updating and tracking carries until it is confirmed that the speculative event has occurred. The array logic control is less complicated than if it were tracking all of the speculative carry bits, and there is a savings in power usage. In addition, there is increased accuracy in the PMCs in the RAM array. By virtue of the teachings herein, there is also an improvement in computer operation due in part to a reduction in processing overhead and storage, as well as a reduction in power consumed.

Additional advantages of the computer-implemented method and device of the present disclosure are disclosed herein.

Example Embodiment

FIG. 1 illustrates a constrained carry scheme 100 for a processor core, consistent with an illustrative embodiment. It is to be understood that the drawing is provided for illustrative purposes and the present disclosure is not limited to the arrangement of FIG. 1 shown and described herein.

The RAM array 105 includes a plurality of special purposes registers (SPRS) that are embedded on a processor chip. A plurality of the SPRS are configured as the upper portion of speculative counters 110. As PMCs have the capability to increment every cycle, the pre-counter portion (including the primary pre-counter 115 and the secondary (backup) pre-counter 120 are implemented using latches for instantaneous updating and visibility. The RAM array includes commands, address and control information by pipelining. The primary and secondary pre-counters 115, 120 are used to make operation of the pipelining less complicated.

During a speculative event period, as it is unknown whether the speculative event will occur when the primary pre-counter 115 counts to a maximum value, the carry bit is output to a carry controller 130. The carry controller will send the carry bit to the carry latch 125 where it is stored during the speculative event period.

With continued reference to FIG. 1, when it is determined that the speculative event has occurred, the carry stored in the speculative carry latch 125 is sent to the RAM array logic 135 for update of the associated primary upper portion 110 of the speculative counter. The "T0", "T1", shown in the pre-counter and upper portion boxes are an identification of the different threads. A multiplexer 140 receives output from the RAM array 105 and in conjunction with the RAM array controller 135 and another input, for example, from another multiplexer 145 is used to send, for example, SPR read data from the plurality of PMCs.

FIG. 2 illustrates an example of the interaction between a primary and secondary pre-counter portions of a speculative carrier, consistent with an illustrative embodiment. The pre-counter portion includes a primary pre-counter 205 and a secondary (e.g., backup) pre-counter 210. When the speculative counting is set to 0, (SPEC=0), when counting PMC1 events such as speculative events, both the primary pre-counter 205 and the secondary pre-counter 210 will increment equally with the input event count.

In the case where the SPEC is set to 1 (SPEC=1), the primary counter increments by the speculative event count inputs, while the backup counter holds at a "rewind" value.

If a speculative event occurs, a "charge" determination occurs. The secondary pre-counter 210 is updated with the current speculative count in the primary pre-counter 205.

If a speculative event does not occur, then a "rewind" determination occurs, in which the primary pre-counter 205 is reloaded with the backup value in the secondary pre-counter 210 to return to the pre-speculative count value.

Example Process

Figure 3:
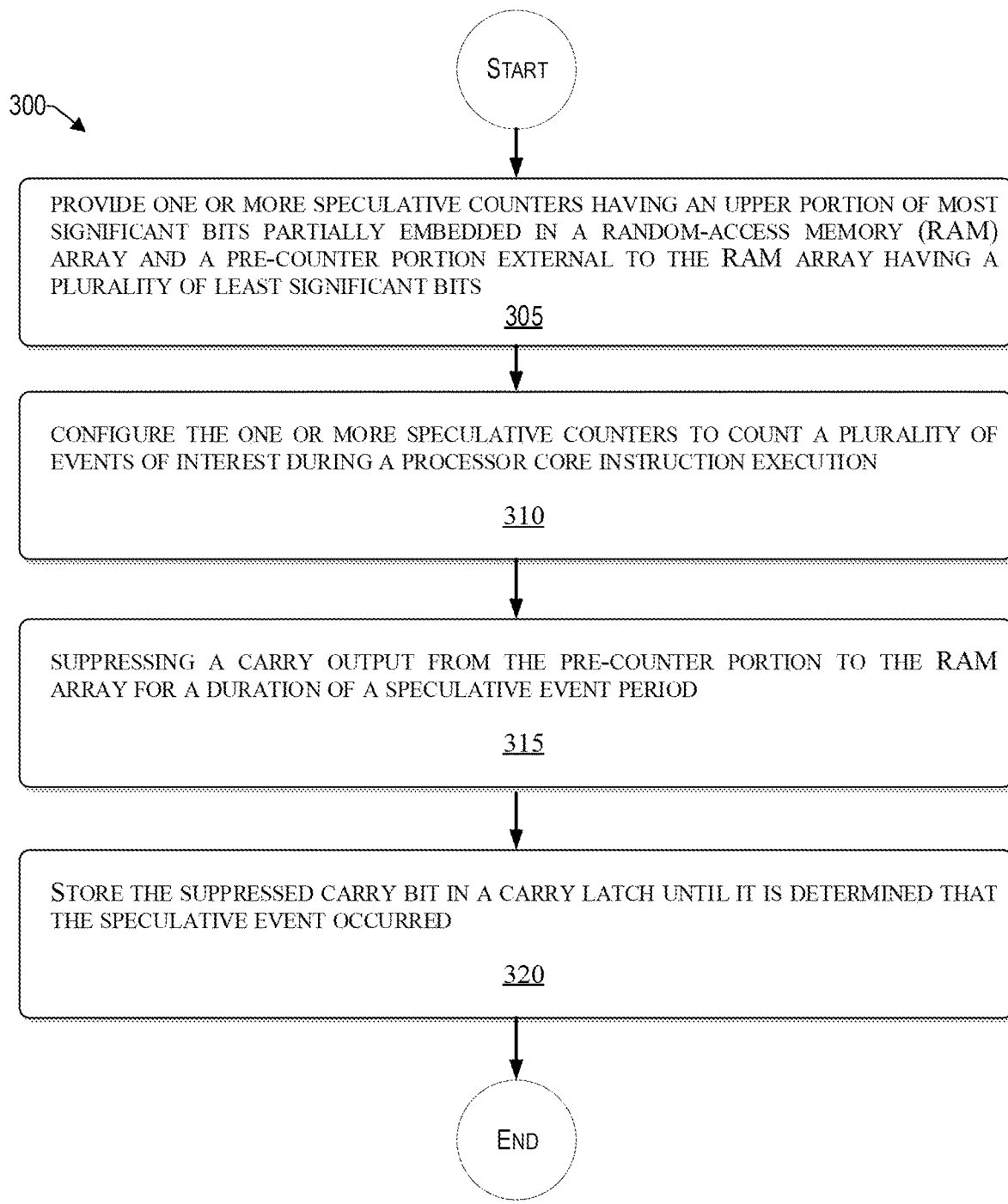
FIG. 3 is a flowchart illustrating of an operation of a constrained carry for speculative counters, consistent with an illustrative embodiment.

With the foregoing overview of the example architecture, it may be helpful now to consider a high-level discussion of an example process. To that end, FIG. 3 is a flowchart illustrating a computer-implemented method of consistent with an illustrative embodiment. FIG. 3 is shown as a collection of blocks, in a logical order, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process.

At operation 305, one or more speculative counters are partially embedded in a RAM array 105 (see FIG. 1). Each counter has an upper portion of most significant bits that are embedded in the RAM array and a pre-counter portion of least significant bits that are external to the RAM array. The pre-counters can be implemented as latches.

At operation 310, the speculative counters are configured to count a plurality of events of interest during a processor core execution. As a speculative event may not occur, the counting starts with pre-counter portions shown as a primary pre-counter 115 and a secondary pre-counter 120 (FIG. 1). As the RAM Array 105 has other operations that occur in a pipeline including thread remapping, task switching, SPR read, or SPR write, the pre-counter portions can perform counting for speculative events to make the control of the RAM array less complex.

At operation 315, a carry out operation from the pre-counter portion, such as from the primary pre-counter 115 of the thread PMC1, is suppressed for the duration of a speculative event period. In other words, the associated primary upper portion counter 110 embedded in the RAM array 105 is not updated with the speculative carry. This operation prevents using the RAM Array logic to track the carries of speculative events that may not occur.

At operation 320, the carry bit output from the primary pre-counter 115 is stored in a carry latch 125 (see FIG. 1) until the speculative period has ended and it is determined that the speculative event has occurred. The carry controller sends the carry bit to the RAM array logic 135 upon confirmation that the speculative event has occurred. This method will be performed for each of the threads of the speculative counters.

Example Particularly Configured Computer Hardware Platform

Figure 4:
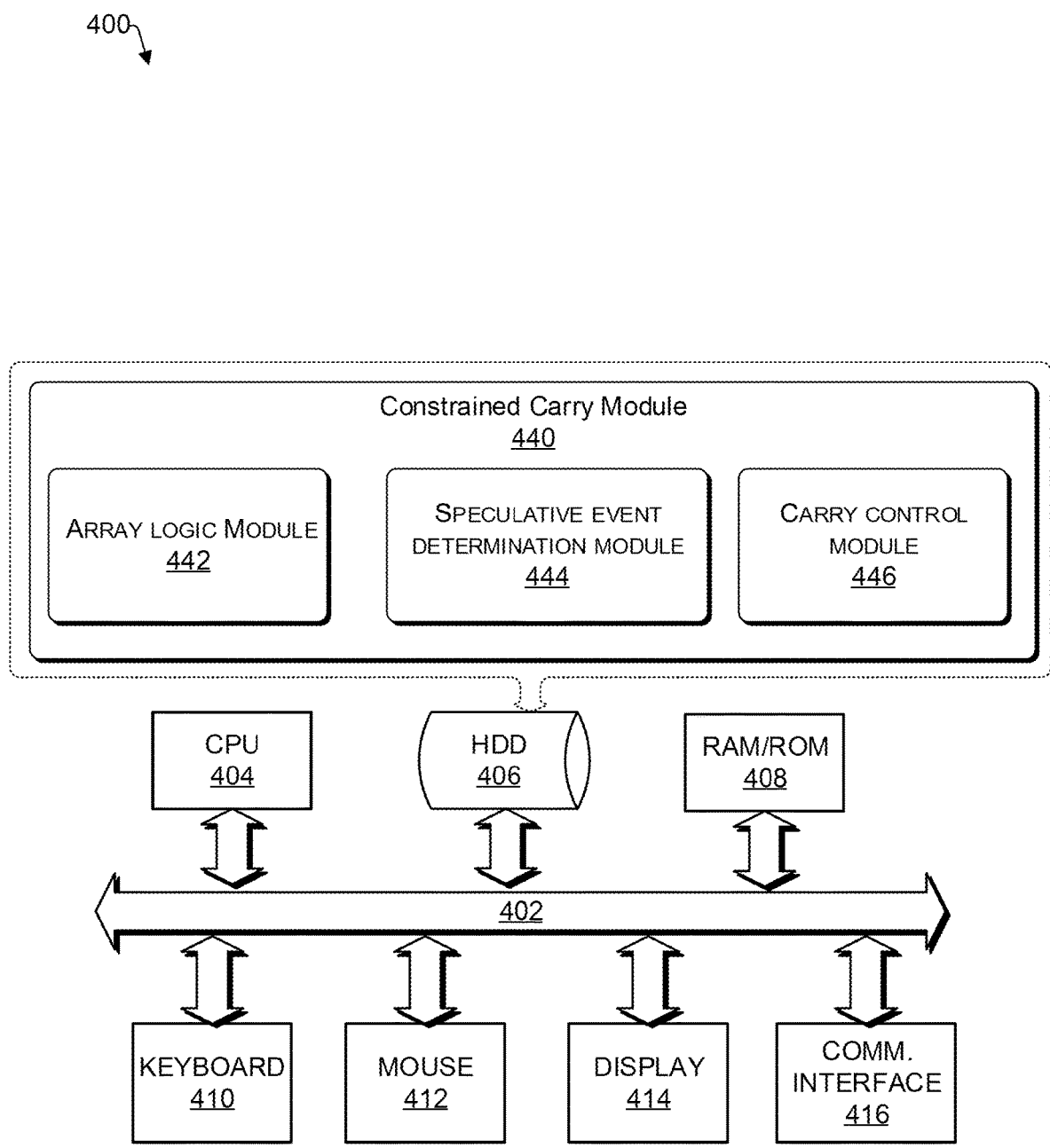
FIG. 4 is a functional block diagram illustration of a particularly configured computer hardware platform, consistent with an illustrative embodiment.

FIG. 4 provides a functional block diagram illustration 400 of a computer hardware platform. In particular, FIG. 4 illustrates a particularly configured network or host computer platform 400, as may be used to implement the method shown in FIG. 3.

The computer platform 400 may include a central processing unit (CPU) 404, a nonvolatile mass data storage such as a hard disk drive (HDD) or a Solid-State Drive (SDD) 406, random access memory (RAM) and/or read-only memory (ROM) 408, a keyboard 410, a mouse 412, a display 414, and a communication interface 416, which are connected to a system bus 402. The HDD 406 can include data stores. In one embodiment, the HDD 406 has capabilities that include storing a program that can execute various processes, such as machine learning and prediction optimization.

In FIG. 4, there are various modules shown as discrete components for ease of explanation. However, it is to be understood that the functionality of such modules and the quantity of the modules may be fewer or greater than shown.

The constrained carry module 440 is configured to control the operation of the modules 442-446 to perform the various operations for a constrained carry operation consistent with an illustrative embodiment. The array log module 442 is configured to control a RAM array (see 105 in FIG. 1) that has performance monitoring counters (PMC) that include speculative counters. The PMCs are special purpose registers (SPRS) that can receive commands for reading data, writing data, thread remapping, task switching, and many other functions. The Array logic module 442 controls and tracks such tasks. In addition, the array logic module controls sending to the particular speculative counter thread the carry bit(s) provided from the pre-counters that have been stored in a carry latch 125 (see FIG. 1).

The speculative event determination module 444 identifies speculative events that may occur in the processor core and instruction stream execution to determine whether certain speculative events have occurred. This information is used to perform charge or rewind operations in the pre-processor portion of the counters (see 115 and 120 in FIG. 1).

The carry control module 446 is configured to perform carry suppression during a speculative event period by storing carry bits from the primary pre-counter into a speculative carry latch 125 (see FIG. 1). Upon completion of a speculative event period and/or confirmation that a speculative event has occurred, the carry control module controls retrieving the carry bit from the speculative carry latch 125 and providing the carry bit and any associated identifying information to the array logic 135 of the RAM array 105.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

The components, steps, features, objects, benefits, and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

The flowchart, and diagrams in the figures herein illustrate the architecture, functionality, and operation of possible implementations according to various embodiments of the present disclosure.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any such actual relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method of constrained carries on speculative counters, the method comprising:
   providing one or more speculative counters having an upper portion of most significant bits partially embedded in a random-access memory (RAM) array and a pre-counter portion external to the RAM array having a plurality of least significant bits;
   configuring the one or more speculative counters to count a plurality of events of interest during a processor core instruction execution;
   suppressing a carry output from the pre-counter portion to the RAM array for a duration of a speculative event period; and
   sending the suppressed carry stored in a speculative carry latch to the RAM array for updating the RAM array in response to both the carry output and a wrapping to 0 having occurred in a primary pre-counter associated with a speculative event.

2. The computer-implemented method of claim 1, further comprising:
   implementing the pre-counter portion of each speculative counter with latches; and storing the suppressed carry output in the speculative carry latch.

3. The computer-implemented method of claim 1, further comprising:
configuring the pre-counter portion of each speculative counter to include the primary pre-counter configured to count the plurality of events of interest during the speculative event period;
storing a backup copy of the primary pre-counter in a secondary pre-counter; and
storing a rewind value in the secondary pre-counter.

4. The computer-implemented method of claim 3, further comprising wrapping the primary pre-counter to 0 after the carry output is stored in the speculative carry latch.

5. The computer-implemented method of claim 4, further comprising:
incrementing the primary pre-counter based on a further count of speculative events until a maximum primary pre-counter value is reached that is 1 less than the secondary pre-counter value; and
pausing an updating of the primary pre-counter for a duration of the speculative event.

6. The computer-implemented method of claim 3, further comprising updating the secondary pre-counter to a value of the primary pre-counter.

7. The computer-implemented method of claim 3, further comprising:
performing a rewind disposition upon determining the speculative event did not occur during the speculative event period;
wherein the rewind disposition includes clearing the speculative carry latch to an inactive state; and
reloading the primary pre-counter with a value of the secondary pre-counter.

8. The computer-implemented method of claim 3, further comprising:
determining that the speculative event has occurred and the primary pre-counter associated with the speculative event has not exceeded a bit-width limit and suppressed an output carry; and
updating the secondary pre-counter associated with the speculative event to include a value of the primary pre-counter value in response to determining a charge speculative event disposition has occurred.

9. The computer-implemented method of claim 3, further comprising:
determining that a rewind disposition is to occur by determining that the speculative event did not occur during the speculative event period; and
updating the primary pre-counter with a value of the secondary pre-counter.

10. A carry suppression system of a processor core, the carry suppression system comprising:
one or more speculative counters configured to count a plurality of speculative events of interest during a processor core instruction execution, wherein:
each of the one of more speculative counters comprises an upper portion partially embedded in a random-access memory (RAM) array configured to store a most significant plurality of bits, and a pre-counter portion externally connected to the RAM array; and
the pre-counter portion is configured to store a plurality of least significant bits; and
a carry controller connected to the pre-counter portion, configured to:
control a sending of a carry bit from the pre-counter portion of the one or more speculative counters, wherein the carry controller is further configured to suppress the sending of the carry bit from the pre-counter portion to the upper portion for a duration of a speculative event period; and
send the suppressed carry stored in a speculative carry latch to the RAM array for updating the RAM array when both the carry output and a wrapping to 0 has occurred in a primary pre-counter associated with a speculative event.

11. The carry suppression system according to claim 10, wherein:
the speculative carry latch is connected to the carry controller and configured to store the suppressed carry bit output from the pre-counter portion.

12. The carry suppression system according to claim 11, wherein the pre-counter portion of each speculative counter comprises:
the primary pre-counter configured to count events of interest during the speculative event period; and
a secondary pre-counter configured to store a backup copy of the primary pre-counter and to store a rewind value.

13. The carry suppression system according to claim 12, further comprising:
a RAM array controller connected to the RAM array and the carry controller, wherein the RAM array controller is configured to control reading from and writing to the RAM array including updating the RAM array with a carry bit received from the carry controller.

14. The carry suppression system according to claim 13, wherein the carry controller is configured to wrap the primary pre-counter to 0 at the same time or after the carry output is stored in the speculative carry latch.

15. The carry suppression system according to claim 14, wherein the carry controller is configured to:
determine whether the speculative event has actually occurred with a charge disposition.

16. The carry suppression system according to claim 15, wherein the carry controller is further configured to:
increment the primary pre-counter based on a count of speculative events until a maximum primary pre-counter value is reached that is 1 less than the secondary pre-counter value; and
pause the updating of the primary pre-counter for a duration of the speculative event.

17. The carry suppression system according to claim 16, wherein the carry controller is further configured to update the secondary pre-counter to a value of the primary pre-counter.

18. The carry suppression system according to claim 12, wherein the carry controller is further configured to:
perform a rewind disposition based on a determination that the speculative event has not occurred during the speculative event period, wherein the rewind disposition comprises clear the speculative carry latch to an inactive state, and reload the primary pre-counter with a value of the secondary pre-counter.

19. A non-transitory computer readable storage medium tangibly embodying a computer readable program code having computer readable instructions that, when executed, causes a computer device to carry out a method of constrained carries on speculative counters, the method comprising:
configuring one or more speculative counters having an upper portion of most significant bits partially embedded in a random-access memory (RAM) array and a pre-counter portion external to the RAM array having a plurality of least significant bits;

configuring the one or more speculative counters to count a plurality of events of interest during a processor core instruction execution;

suppressing a carry output from the pre-counter portion to the RAM array for a duration of a speculative event period;

storing the suppressed carry output in a speculative carry latch for a duration of a speculative period; and sending the suppressed carry stored in the speculative carry latch to the RAM array for updating the RAM array when both the carry output and a wrapping to 0 has occurred in a primary pre-counter associated with a speculative event.

* * * * *